United States Patent [19]

Uemura et al.

[11] 4,145,716
[45] Mar. 20, 1979

[54] DESCRAMBLING DEVICE IN CATV SYSTEM

[75] Inventors: Hiroki Uemura; Yoshifumi Saeki, both of Tokyo, Japan

[73] Assignee: Pioneer Electronic Corporation, Tokyo, Japan

[21] Appl. No.: 790,146

[22] Filed: Apr. 22, 1977

[30] Foreign Application Priority Data

Apr. 23, 1976 [JP] Japan .................................. 51-46342

[51] Int. Cl.² .............................................. H04N 7/16
[52] U.S. Cl. .................................... 358/118; 325/476; 358/121
[58] Field of Search ...................... 358/118, 120, 121; 325/34, 65, 474–476

[56] References Cited

U.S. PATENT DOCUMENTS

| | | | |
|---|---|---|---|
| 2,709,218 | 5/1955 | Gabrilovitch | 325/65 |
| 3,081,376 | 3/1963 | Loughlin et al. | 358/120 |
| 3,544,904 | 12/1970 | Eness | 325/476 |
| 3,729,576 | 4/1973 | Court | 358/120 |
| 4,024,575 | 5/1977 | Harney et al. | 358/118 |

*Primary Examiner*—S. C. Buczinski
*Attorney, Agent, or Firm*—Fraser and Bogucki

[57] ABSTRACT

A descrambler system for a CATV television signal having IF audio, video and synchronizing components that is scrambled by a first amplitude modulation of the IF audio component and a second amplitude modulation of the combined audio, visual and synchronizing components by a key signal having a frequency that is an integral multiple of a 15.75 KHz horizontal synchronizing frequency includes a demodulator responsive to the scrambled signal, a key signal detecting circuit coupled to derive the key signal from the audio portion of the demodulator output and a dynamic limiter circuit coupled to remove noise from the key signal and provide a noise free sine wave key signal to the demodulator. The dynamic limiter circuit is an inexpensive circuit providing the signal processing characteristics of a much more expensive narrow band filter. It includes a current limiter circuit driven by a current source in proportion to the magnitude of the scrambled signal to provide a square wave signal at the key signal frequency that is proportional in magnitude to the scrambled signal and a simple filter that converts the square wave signal to a sine wave key signal that is used by the demodulator circuit with the exact shape, frequency and amplitude characteristics for noise free unscrambling of the scrambled CATV signal.

11 Claims, 2 Drawing Figures

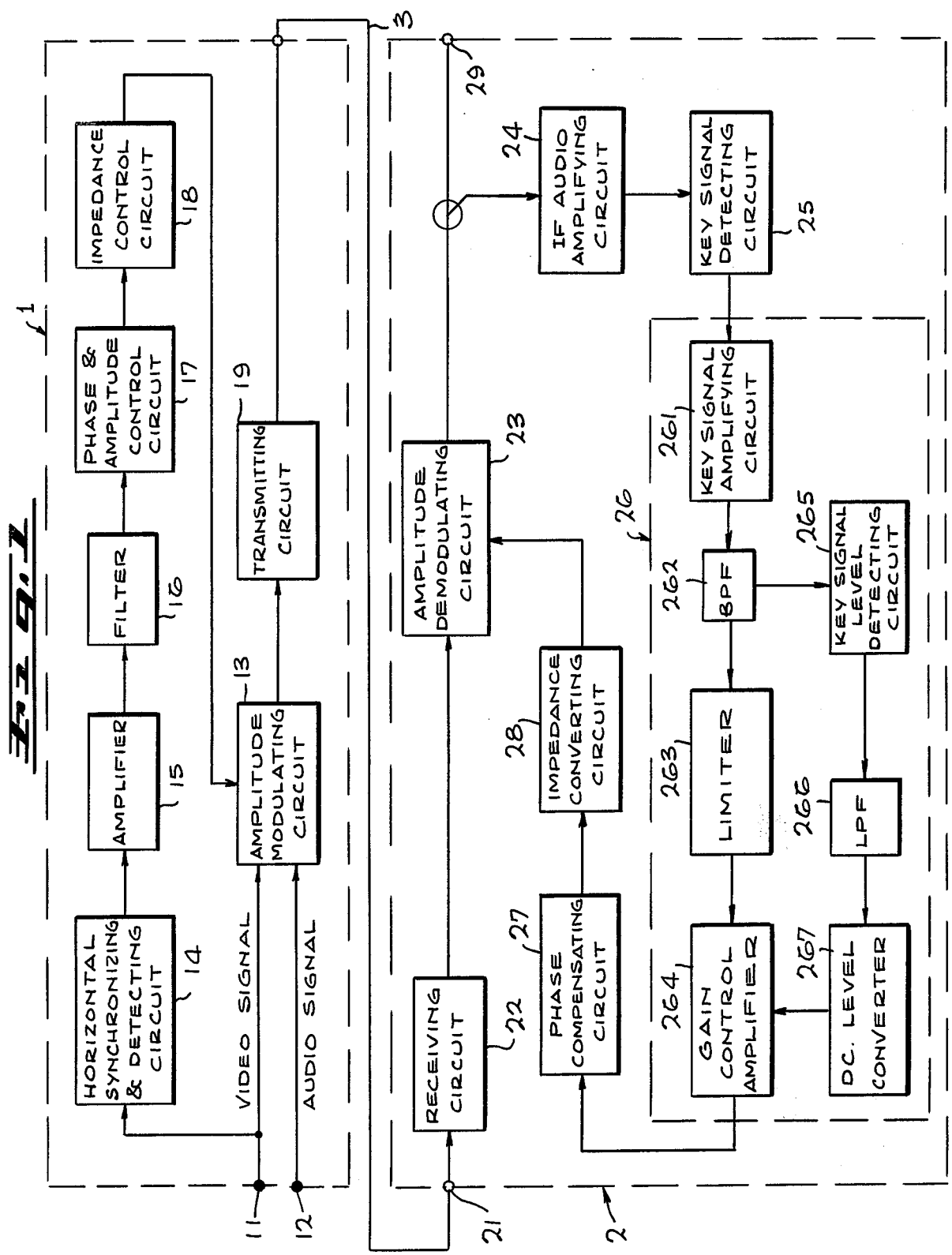

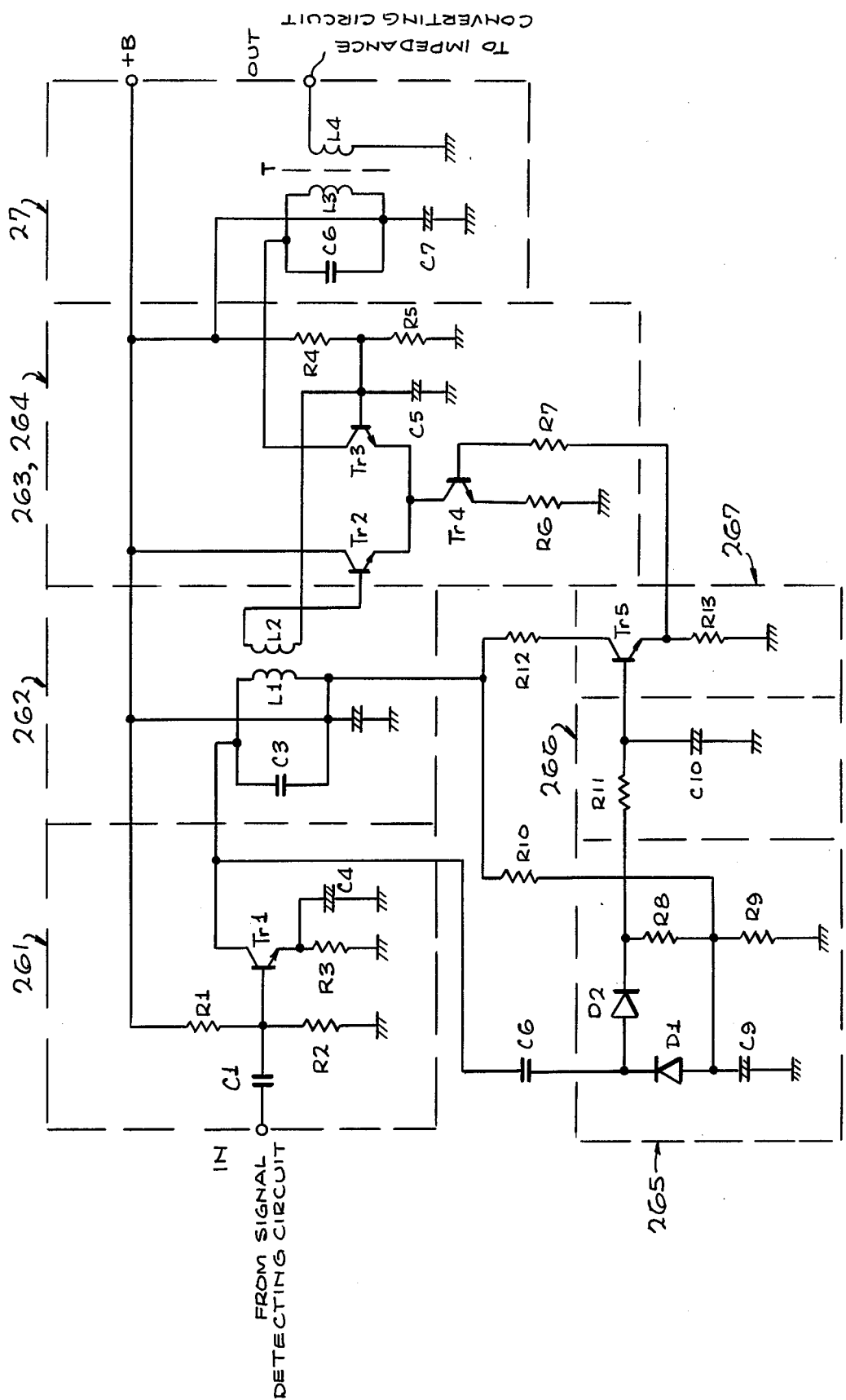

DESCRAMBLING DEVICE IN CATV SYSTEM

BACKGROUND OF THE INVENTION

This invention relates to a descrambling device in a CATV system for reforming the scrambled picture video signal into the normal original signal.

In order to supply a special picture video signal to special subscribers among the many subscribers of a CATV system, it is necessary to make normal reproduction of the picture video signal at the terminal units of subscribers impossible except in the case of the special subscribers. Therefore, there is utilized means for transmitting the special picture-video signal altered by a scrambling device and means for enabling of reproducing the scrambled picture video signal by reforming the scrambled picture into the normal picture by a descrambling device for the special subscribers.

Heretofore, it has been known to use the so-called AM gray sync method of scrambling. That is, a scrambling operation is conducted by producing sine waves (key signal) at the horizontal scan frequency of 15.75 KHz (or an integral multiple) synchronized with the horizontal synchronizing signal at the transmitting end of the system and by amplitude-modulating the picture video signal with this key signal. In one arrangement the IF audio signal is amplitude modulated with the key signal, combined with the video and synchronizing signals and then amplitude modulating the combination with the key signal. A descrambling operation is conducted by taking out the key signal from the receiving signals and by amplitude-demodulating the picture video signal by inverting the phase of the key signal thus taken out at the receiving end of the CATV system.

However, for the descrambling operation it is difficult to take out only the key signal because noise or other disturbing signals are mixed with this key signal. Therefore, a sharp bandpass filter is needed, which is expensive and therefore disadvantageous.

It is, therefore, one object of the present invention to provide a descrambling device in a CATV system which can eliminate the aforementioned disadvantages of the conventional descrambling device of the CATV system and which can obtain the key signal free of the noise components and other disturbing components without using sharp bandpass filters so as to attain a high quality picture.

SUMMARY OF THE INVENTION

A descrambling system in accordance with the invention includes a demodulator receiving a scrambled CATV signal, a signal detecting circuit coupled to derive a noisy key signal from the CATV signal, and a dynamic limiter circuit coupled to convert a noisy sine wave key signal from the signal detecting circuit to a noise free high quality sine wave key signal of proper magnitude, shape and frequency for use by the demodulating circuit to exactly demodulate the scrambled CATV signal to provide a standard television signal for sharp, clear reception. The dynamic limiter circuit includes a current limited differential amplifier having a current source driving the amplifier in response to a peak amplitude detector circuit to provide a square wave signal at the frequency and amplitude of the noisy key signal. A simple tuned filter converts the square wave to a high quality, noise free sine wave key signal since the nearest significant noise component of the square wave signal is the third harmonic of the 15.75 KHz fundamental frequency.

BRIEF DESCRIPTION OF THE DRAWINGS

A better understanding of the invention may be had by reference to the following description, taken in conjunction with the accompanying drawings, in which:

FIG. 1 is a block diagram for explaining the construction of the descrambling device in a CATV according to the present invention; and FIG. 2 is a schematic diagram of the dynamic limiter 26 shown in FIG. 1.

DETAILED DESCRIPTION OF THE INVENTION

The descrambling device of the present invention will now be described in detail with reference to the drawings. FIG. 1 is a block diagram of an entire unit including a scrambling device for explaining a descrambling device constructed according to the present invention. In FIG. 1, reference numeral 1 is a scrambling device which has a transmitting circuit 19 (depicted only generally), reference numeral 2 is a descrambling device which has a receiving circuit 22, and reference numeral 3 is a cable for connecting the transmitting end of the system to the receiving end of the system. Actually, a number of terminal units (receiving end) are coupled for one central or head end unit (transmitting end), but one terminal unit is shown connected to one head end unit in the drawing for purposes of explanation.

The video picture signal to be transmitted is fed to the input terminal 11, the audio signal is fed through the input terminal 12, and both are fed to an amplitude modulating circuit 13. The video signal fed to the input terminal 11 is coupled to a horizontal synchronizing detecting circuit 14, in which the horizontal synchronizing signal is taken out and is amplified by an amplifier 15. A sine wave of 15.75 KHz of the same frequency as the horizontal synchronizing signal is then taken out by a filter 16. This sine wave (key signal) is controlled to be inverted (of opposed phase) with respect to the horizontal synchronizing signal and the amplitude of the signal is controlled to a predetermined level by a phase and amplitude controlling circuit 17. The signal is then fed through an impedance control circuit 18 for controlling the impedance to an amplitude modulating circuit 13. Here, the audio signal from terminal 12 is amplitude modulated with the key signal and then combined with the video signal, including the synchronizing signals. The combined video signal from the input terminal 11 and modulated audio signal are amplitude-modulated by the key signal sine wave (15.75 KHz) from the impedance control circuit 18. This is, these signal are so amplitude-modulated that they are most suppressed at the horizontal synchronizing signal of the video signal and are most amplified at an intermediate point relative to the adjacent pair of horizontal synchronizing signals. Accordingly, even if the signal thus modulated is received at a terminal unit, the picture cannot be horizontally synchronized so that the picture is effectively destroyed, i.e., is scrambled so as not to obtain a normal picture. The signal thus scrambled by the amplitude-modulating circuit 13 is fed by a transmitting circuit 19 to the cable 3.

In the descrambling device 2, the signal thus fed through the cable 3 is received through the input terminal 21 at the receiving end (terminal unit end) by a receiving circuit 22 and is fed to an amplitude demodulating circuit 23. The output of the amplitude demodulating circuit 23 is fed through the output terminal 29 to a picture reproducing circuit (not shown), but may remain scrambled at this point.

Part of the output of the amplitude demodulating circuit 23 is fed to an IF audio amplifying circuit 24 of narrow band and is here amplified along with the audio signal. The key signal (15.75 KHz) is thereafter detected by a key signal detecting circuit 25. This detected output is fed to a dynamic limiter 26 which is hereinafter described in greater detail relative to the circuit in FIG. 2. The input signal of the dynamic limiter 26 is amplified by a key signal amplifying circuit 261 and signal components other than 15.75 KHz are removed from the signal by a bandpass filter 262. Then, the signal is formed to a periodic wave of given maximum amplitude by a limiter or clipping circuit 263 and is fed to a gain control amplifier 264. Part of the input of the bandpass filter 262 is fed to a key signal level detecting circuit 265 so that variations in level of the key signal are detected. However, because the noise and high frequency variations are also detected in addition to the level variation of the key signal, these components are removed by a low pass filter 266 having a cutoff frequency of about 8 Hz. Thus only the variations in level of the key signal component are taken out and the signal is level converted in a predetermined ratio by a DC level converter 267 and is then applied to the gain control amplifier 264. The result is that the key signal of constant maximum level from the limiter 263 is amplified in response to the level variation of the original key signal. The output of the gain control amplifier 264 is so controlled as to be accurately in opposed phase with respect to the key signal from the receiving circuit 22 by the phase compensating circuit 27 and is further applied through the impedance converting circuit 28 to the amplitude demodulating circuit 23. The scrambled video signal from the receiving circuit 22 is demodulated by the key signal of opposite phase from the impedance converting circuit 28 in the amplitude demodulating circuit 23, i.e., is descrambled so that the signal is reproduced as the original picture video signal fed to the input terminal 11.

FIG. 2 is a circuit diagram of one embodiment of the dynamic limiter 26 shown in FIG. 1. The key signal detected by the key signal detecting circuit 25 is amplified by the transistor Tr1 of the key signal amplifying circuit 261 and is then formed to a noisy sine wave of 15.75 KHz by the bandpass filter 262 composed of a condenser C3 and a coil L1. The sine wave output is then fed to a differential amplifier composed of transistors Tr2, Tr3 and Tr4, which from an integral current mode limiter 263 and gain control amplifier 264. On the other hand, part of the output of the key signal amplifying circuit 261 (substantially unaffected by the filtering effect of the bandpass filter 262) is rectified by the diodes D1 and D2 of the key signal level detecting circuit 265, and the noise components of the signal are removed by the 8 Hz low pass filter 266 composed of a resistor R11 and a condenser C10 to generate a gain control signal that is indicative of the magnitude of the scrambled video signal. This gain control signal is applied to the base of a transistor Tr5 of the DC level converter 267. Both amplitude level variations of the key signal envelope and the AC wave components of the key signal are retained in the output of the key signal level detecting circuit 265. These AC components are removed by the low pass filter 266 in a manner that the frequency band of the gain control signal can be controlled by properly selecting the cutoff frequency of the low pass filter 266. For example, if the cutoff frequency of the low pass filter 266 is represented by f1 and the key signal frequency is represented by f, the frequency component below f1 is passed through to the output of the DC level converter 267 so as to control the amplification provided by the gain control amplifier 264.

Thus, the key signal applied to the transistor Tr2 is current amplitude-limited by the transistor Tr4, which operates as a current source for differential amplifier transistors Tr2 and Tr3. A square wave output at the key signal frequency which is level-controlled by the transistor Tr4 in response to the low pass filtered gain control signal is fed to the phase compensating circuit 27 from the collector of the transistor Tr3 and is accordingly phase-compensated. Phase compensating circuit 27 includes a bandpass filter with a pass band centered at the 15.75 KHz key signal frequency. The square wave signal formed by the limiting circuit 263 has no substantial noise components below the third harmonic of the 15.75 KHz fundamental frequency. This third harmonic as well as higher frequency noise signals readily removed by the bandpass characteristic of the inexpensive phase compensating circuit 27 to provide a demodulation key signal having noise free pure sine wave characteristics heretofore attainable only through the use of an expensive narrow band filter. At the same time, the gain control signal, in conjunction with transistor Tr4, maintains the demodulation key signal at the output of circuit 27 at a magnitude proportional to the magnitude of the scrambled video signal for a proper degree of modulation by the demodulation key signal.

As shown by the foregoing description, according to the present invention, there is provided the same result as that using an extremely narrow bandpass filter without using sharp bandpass filter so as to take out only the key signal from a scrambled receiving signal in order to perform a preferable descrambling operation to reproduce a high quality of picture.

What is claimed is:

1. A CATV descrambling device comprising:
a key signal detecting circuit responsive to an information carrying signal, said signal having a frequency component at a known signal frequency, the detecting circuit providing a noise key signal in response to said known frequency signal component;

limiting circuit connected to receive the noisy key signal from the key signal detecting circuit, the limiting circuit including a clipping circuit connected to convert the noisy key signal to a square wave key signal, filter connected to pass a component of the square wave key signal at the known key signal frequency to provide a sine wave key signal, and gain control circuitry connected to control the amplitude of the sine wave key signal in response to the magnitude of the noisy key signal; and an amplitude demodulation circuit connected to demodulate an amplitude modulated information signal in response to the sine wave key signal.

2. The descrambling device according to claim 1 above, wherein the modulated video signal is amplitude modulated by a sine wave signal at the known key signal frequency and the amplitude demodulating circuit modulates the modulated video signal with the sine wave key signal, the phase and magnitude of the sine wave key signal being properly maintained for cancellation of the modulation of the modulated video signal at the key signal frequency.

3. The descrambling device according to claim 2 above, wherein the gain control circuitry includes a peak detector connected to detect the magnitude of peaks of the noisy key signal and generate a gain control signal proportional thereto.

4. The descrambling device according to claim 3 above, wherein the peak detector includes a low pass filter having a cutoff frequency of approximately 8 Hz connected to filter the gain control signal.

5. The descrambling device according to claim 3 above, wherein the clipping circuit is a current limiter circuit including a current source controlling the magnitude of the square wave key signal the current source being coupled to provide a current proportional to the magnitude of the gain control signal.

6. The descrambling device according to claim 5 above, wherein the clipping circuit is a differential amplifier responsive to the key signal with sufficient gain to attain current mode saturation in response thereto.

7. The descrambling device according to claim 1 above, wherein the key signal detecting circuit is connected to derive the noisy key signal from an audio portion of a CATV signal provided at the output of the demodulator after the scrambled CATV signal has been demodulated, the noisy key signal being derived from amplitude modulation of the audio portion by the key signal.

8. A CATV descrambling device comprising:
a key signal detecting circuit connected to receive at least a component of a CATV signal that has been scrambled by amplitude modulation by a scrambling key signal at a known frequency and to generate a noisy key signal in response thereto;
a limiting circuit connected to generate a square wave signal at the known frequency in response to the noisy key signal, the square wave signal having a phase and magnitude responsive to the noisy key signal, the limiting circuit further including a filter connected to provide a sine wave key signal at the known frequency by filtering the square wave signal; and
a demodulating circuit connected to receive and descramble the CATV signal by modulating the CATV signal with the sine wave key signal.

9. The descrambling device according to claim 8 above, further comprising a phase compensating circuit connected between the dynamic limiter circuit and the demodulating circuit to adjust the phase of the sine wave key signal relative to the scrambled CATV signal for proper descrambling modulation by the sine wave key signal.

10. A descrambling device in a CATV system having a horizontal synchronizing signal detecting circuit for detecting a horizontal synchronizing signal from a video signal to be transmitted, a key signal generating circuit for generating a key signal synchronized with the horizontal synchronizing signal obtained by the horizontal synchronizing signal detecting circuit, and an amplitude modulating circuit for amplitude-modulating the signal to be transmitted by the key signal from the key signal generating circuit for scrambling the signal to be transmitted in advance of transmission, the descrambling device comprising a key signal detecting circuit for detecting the key signal from the scrambled signal received after transmission and providing the key signal as an output, a bandpass filtering means for removing components other than the key signal from the output signal of said key signal detecting circuit and providing a filtered key signal as an output, a limiter for forming the amplitude of the filtered key signal output of said bandpass filter constant and providing a square wave signal output, a low frequency voltage level generating circuit for generating a low frequency voltage responsive to the peak signal amplitude of the key signal obtained from said key signal detecting circuit, a gain control amplifier for amplifying the output signal of said limiter with a gain that varies in response to the output voltage of said low frequency voltage level generating circuit, a phase compensating circuit for synchronizing the phase of the output signal of said gain control amplifier with the phase of the key signal obtained from the received signal and providing a synchronized key signal as an output, and means for descrambling the received signal by modulating the received signal with the synchronized key signal from the phase compensating circuit.

11. A descrambling device according to claim 10, wherein said low frequency voltage level generating circuit comprises a low pass filter coupled to receive and filter the key signal output of said key signal detecting circuit and provide an output indicative of the peak signal amplitude of the key signal output, and an amplifying circuit for linearly amplifying the output of said low pass filter.

* * * * *

UNITED STATES PATENT AND TRADEMARK OFFICE
CERTIFICATE OF CORRECTION

PATENT NO. : 4,145,716
DATED : March 20, 1979
INVENTOR(S) : Hiroki Uemura and Yoshifumi Saeki It is certified that error appears in the above-identified patent and that said Letters Patent are hereby corrected as shown below:

Column 2, line 54, after the period (".") and before "is", "This" should read --That--. Column 4, line 40, after "quality" and before "picture", strike "of"; line 45, after "known" and before "signal" insert --key--; line 46, after "a" and before "key", "noise" should read --noisy--; line 49, before "limiting", insert --a--; line 53, after "signal," and before "filter" insert --a--. Column 5, line 16, after "signal" and before "the" (second occurrence), insert a comma --,--.

Signed and Sealed this

Nineteenth Day of June 1979

[SEAL]

Attest:

RUTH C. MASON
*Attesting Officer*

DONALD W. BANNER
*Commissioner of Patents and Trademarks*